(12) United States Patent
Saito

(10) Patent No.: US 6,948,076 B2
(45) Date of Patent: Sep. 20, 2005

(54) COMMUNICATION SYSTEM USING HOME GATEWAY AND ACCESS SERVER FOR PREVENTING ATTACKS TO HOME NETWORK

(75) Inventor: Takeshi Saito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 761 days.

(21) Appl. No.: 09/942,749

(22) Filed: Aug. 31, 2001

(65) Prior Publication Data

US 2002/0046349 A1 Apr. 18, 2002

(30) Foreign Application Priority Data

Aug. 31, 2000 (JP) .......................................... 2000-263873

(51) Int. Cl.[7] .............................................. H04L 9/00
(52) U.S. Cl. ...................... 713/201; 713/151; 713/153; 713/170; 713/188
(58) Field of Search ................................ 713/201, 202, 713/1, 176

(56) References Cited

U.S. PATENT DOCUMENTS 6,161,139 A * 12/2000 Win et al. ................... 709/225
6,182,142 B1 * 1/2001 Win et al. ................... 709/229
6,763,370 B1 * 7/2004 Schmeidler et al. ......... 709/203

FOREIGN PATENT DOCUMENTS

| JP | 10-94199 | 4/1998 |
| JP | 2000-36840 | 2/2000 |

OTHER PUBLICATIONS

Noriko Yokokawa, "Technology that supports the internet on background, No. 13: VPDN and roaming for realizing the outsourcing of the dial–up", ASCII, vol. 3, No. 6, Jun. 1998, pp. 296–299 (with English Abstract).

* cited by examiner

Primary Examiner—Kambiz Zand
(74) Attorney, Agent, or Firm—Oblon, Spivak, McClelland, Maier & Neustadt, P.C.

(57) ABSTRACT

In a communication system using a home gateway device and an access server device, the security function for the home network side is provided by the access server device on the service provider side, so that it becomes possible to prevent attacks from the malicious users with respect to the home network, without implementing excessive security functions in the home gateway device on the home network side and without requiring professional skills for setting and management to the user of the home gateway device.

14 Claims, 11 Drawing Sheets

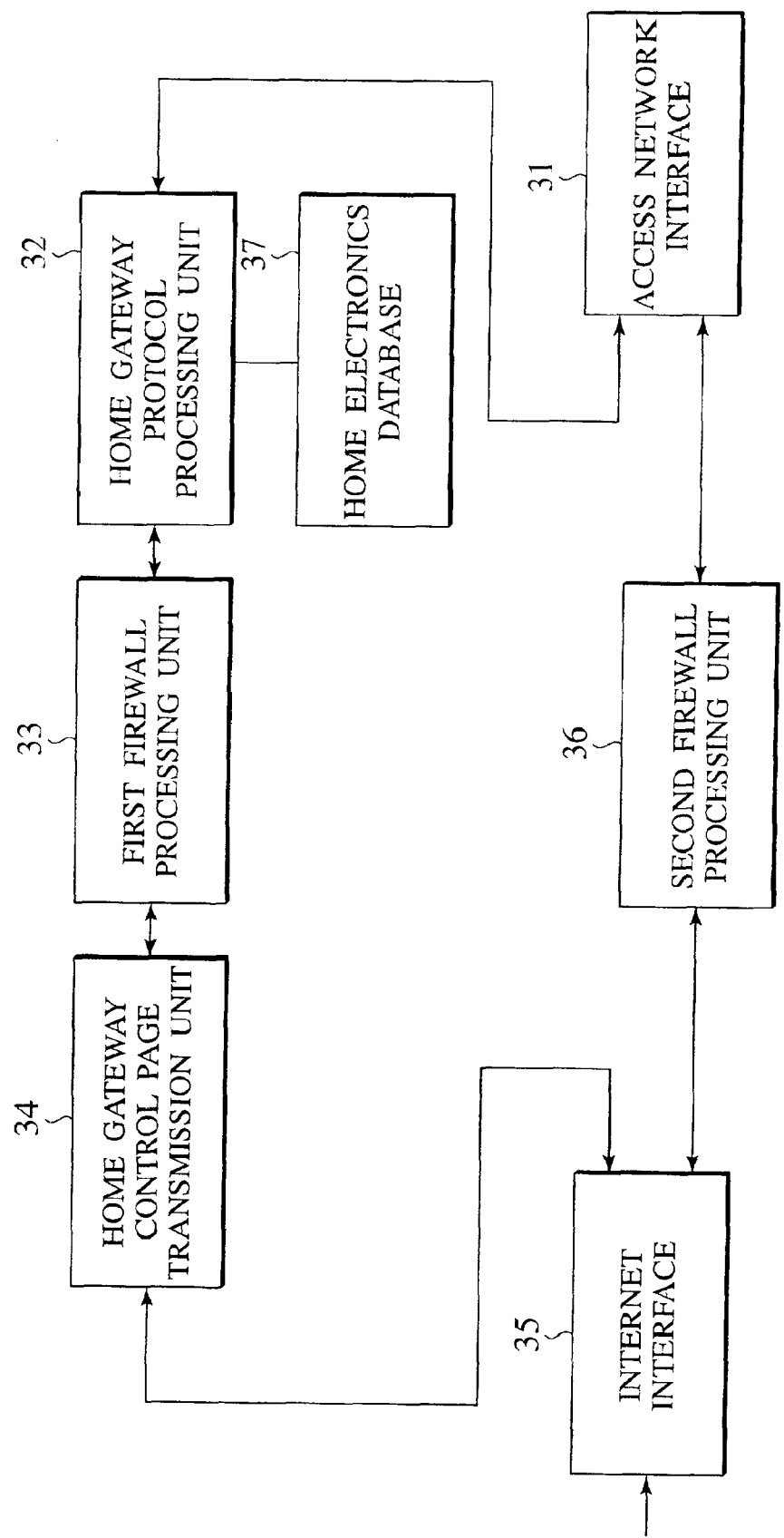

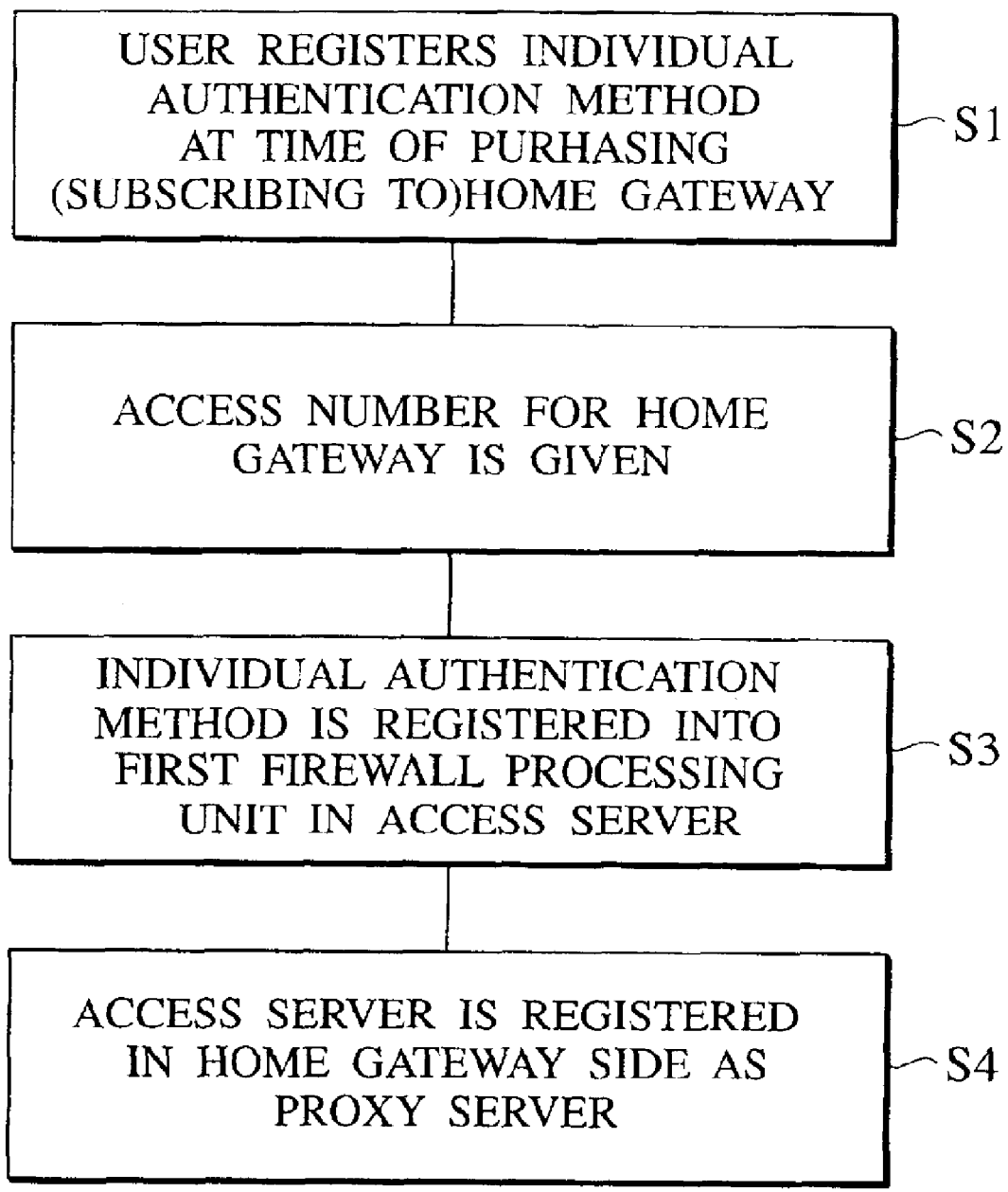

FIG.6

| ACCESS NUMBER | INDIVIDUAL AUTHENTICATION METHOD | COMMUNICATION METHOD WITH RESPECT TO ACCESS NUMBER | AUTHENTICATION CONTENT | ACCESS NUMBER FOR HOME GATEWAY |
|---|---|---|---|---|
| 090-1234-××× × | TERMINAL TYPE | SSL | ONLY SSL INPUTS FROM TERMINAL OF 090-1111-○○○○ ARE ACCEPTABLE | 090-7777-□□□□ |
| 090-5555-△△△△ | FINGERPRINT | S-HTML | ONLY INPUTS FROM FINGERPRINT ID=×××××× ARE ACCEPTABLE | http://www.⬚◨◨. ne.jp/ |
| http://www.◯◯◎. ne.jp/~saito | PASSWORD | IPsec | PASSWORD=1234 | http://△.△.△.△ |
| 090-1234-△△△△ | TERMINAL TYPE | NONE | ONLY INPUTS FROM TERMINALS OF 090-1111-×××× & 090-2222-×××× ARE ACCEPTABLE | DEDICATED LINE (LINK ADDRESS= ××××× ) |

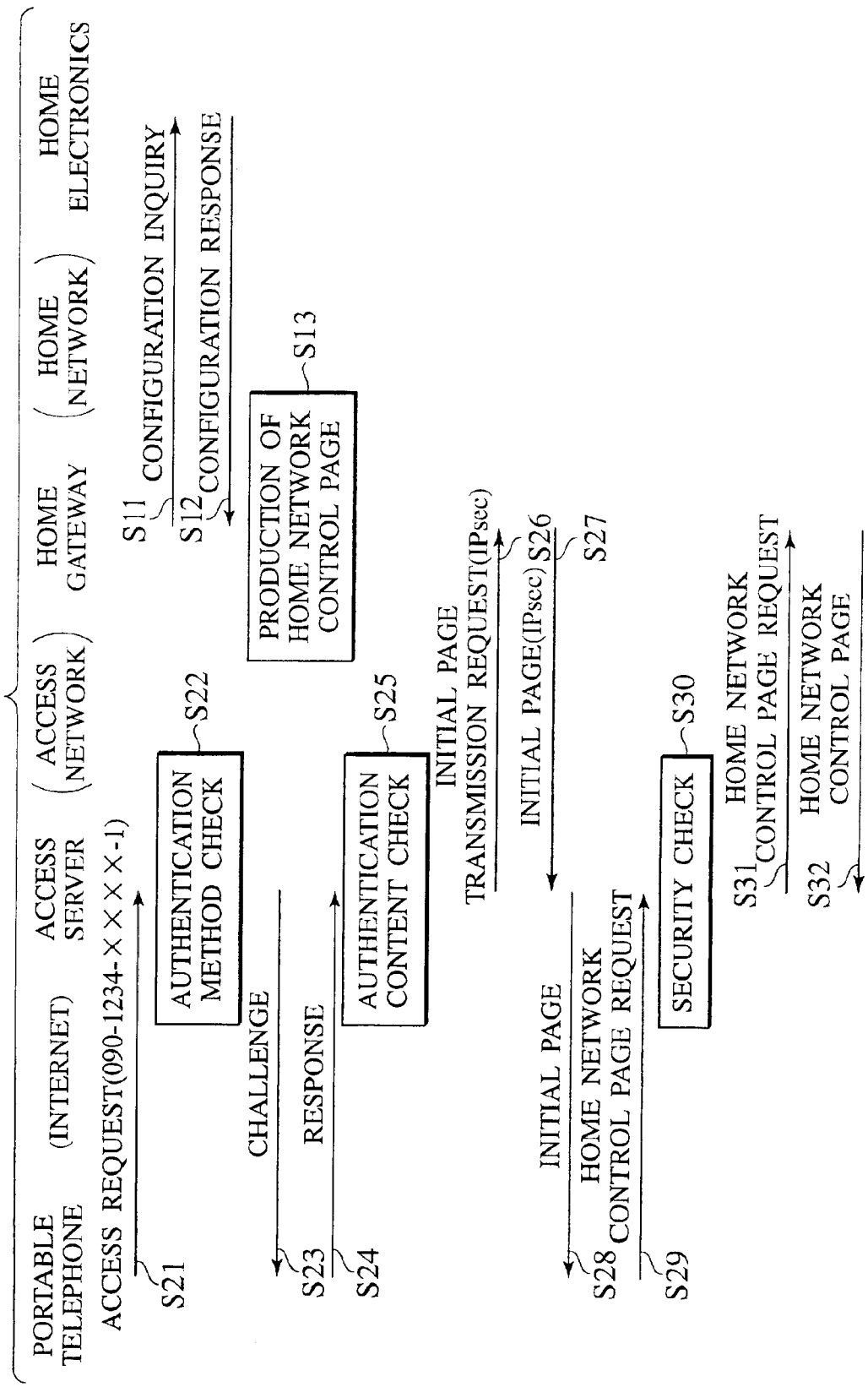

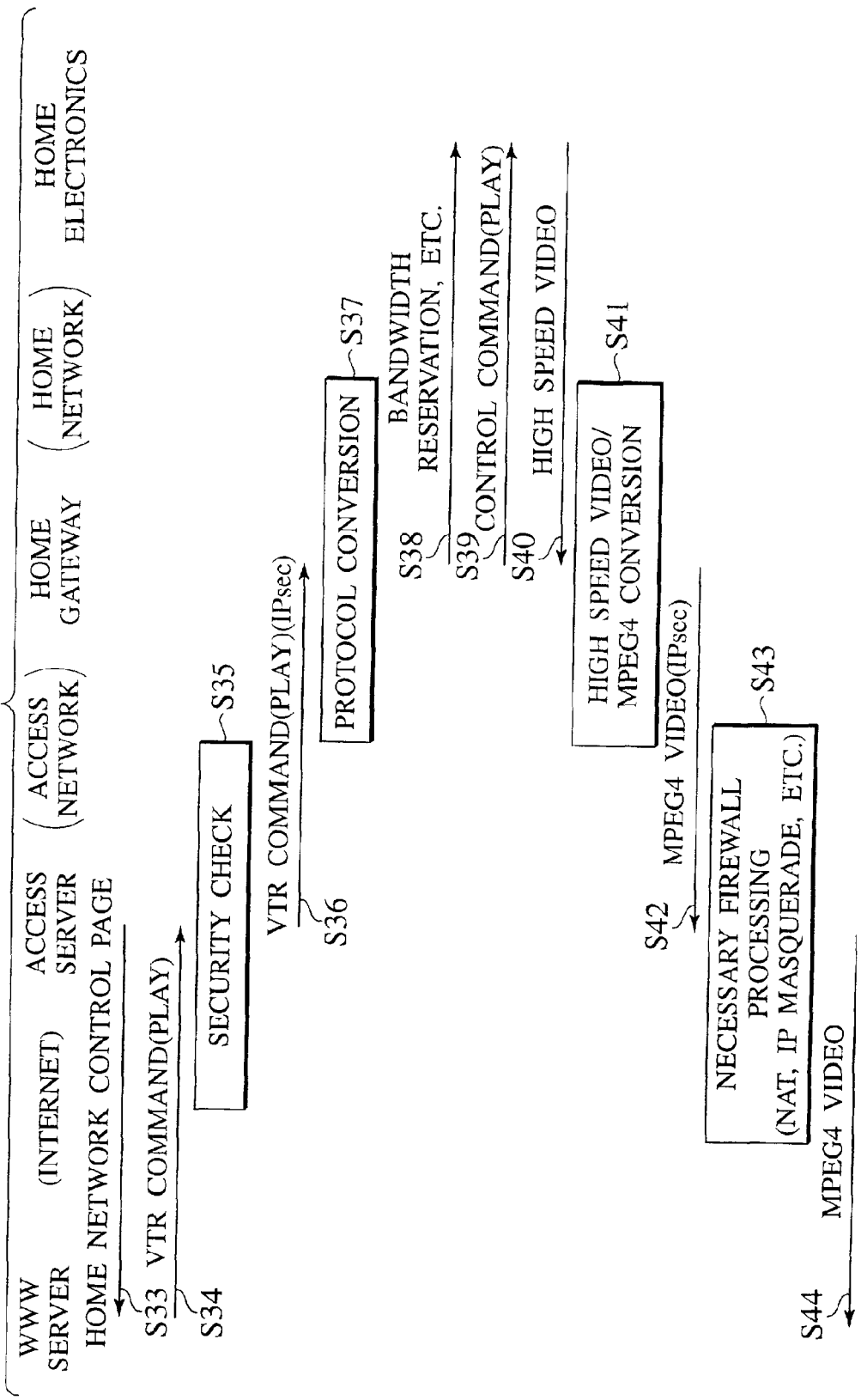

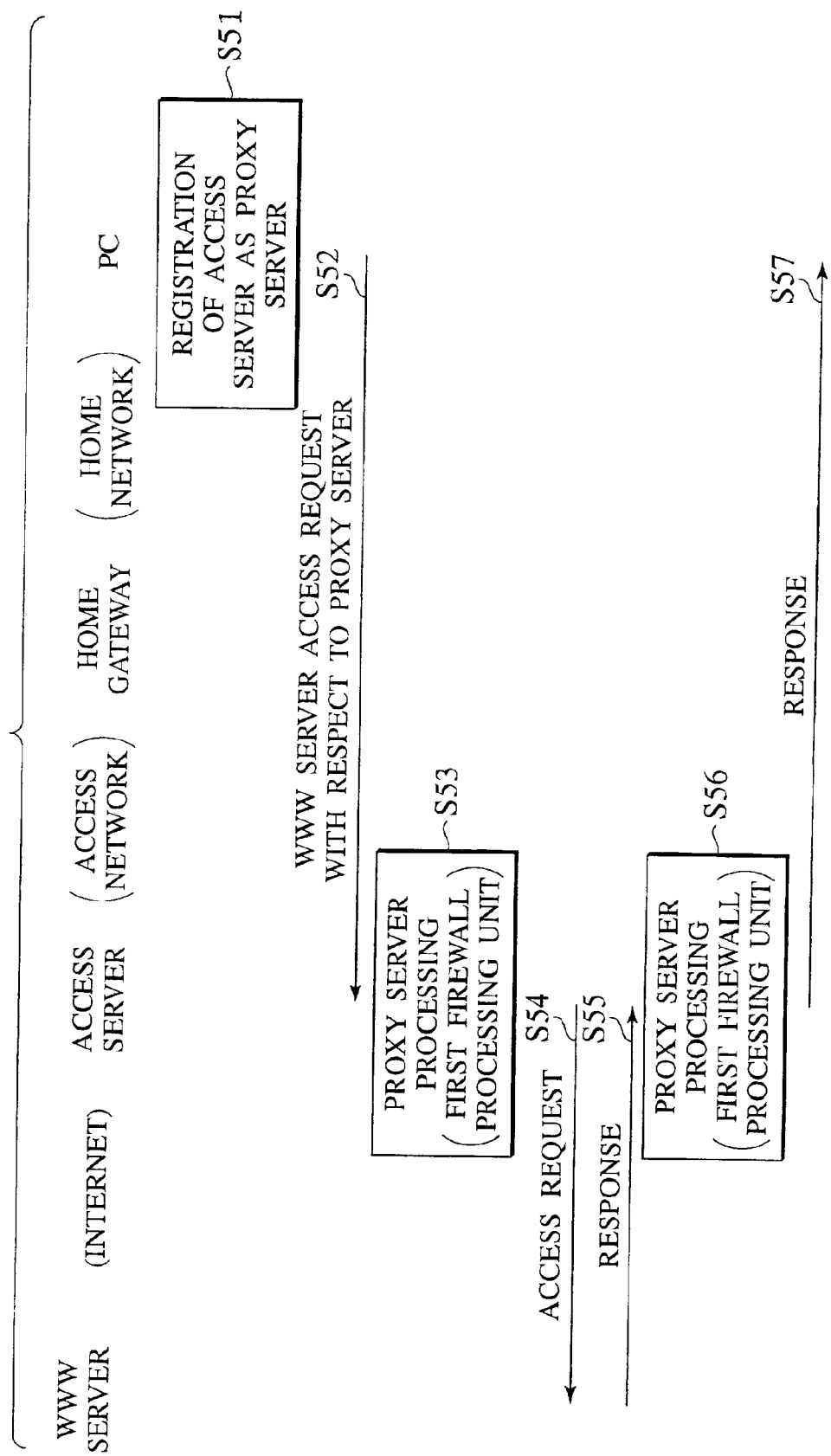

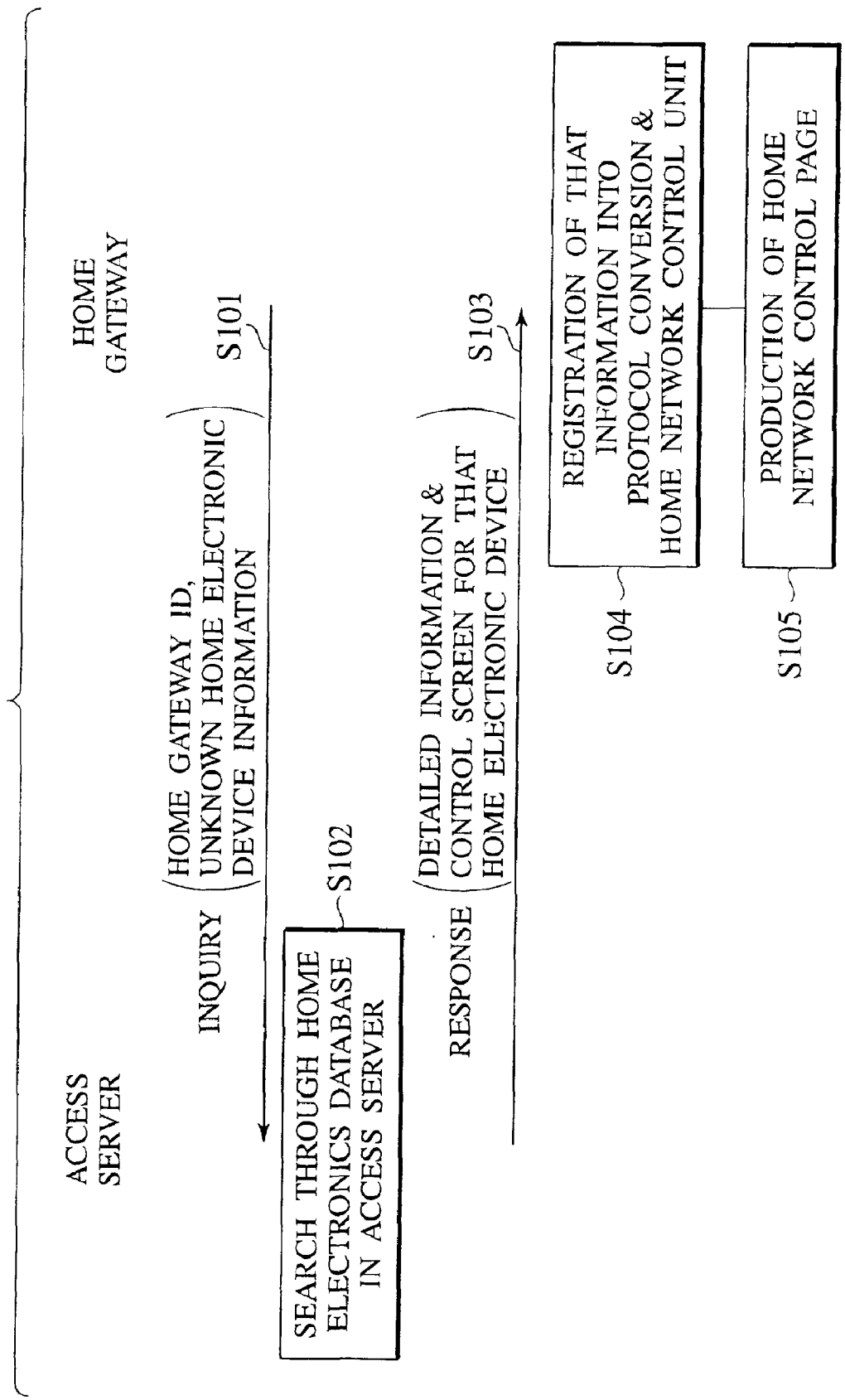

FIG.11

| NETWORK TYPE | SERVICE/SUB-UNIT NAME | ATTRIBUTE INFORMATION | CONTROL SCREEN |
|---|---|---|---|
| IEEE1394 | HOME SERVER | (XML DATA FORMAT) | (XML DATA FORMAT) |
| | ------ | ------ | ------ |
| ECHONET | AUTOMATIC CLEANER | (XML DATA FORMAT) | (XML DATA FORMAT) |
| | ------ | ------ | ------ |

COMMUNICATION SYSTEM USING HOME GATEWAY AND ACCESS SERVER FOR PREVENTING ATTACKS TO HOME NETWORK

BACKGROUND OF THE INVENTION

1. Field of the Invention

The present invention relates to a communication system using a home gateway device to be provided at a home network and an access server for controlling accesses to the home gateway device.

2. Description of the Related Art

In conjunction with the rapid spread of digital home electronics, the so called "home network" for connecting home electronic devices together is becoming popular quickly. This is the phenomenon that is not limited to any particular fields, as exemplified by the IEEE 1394 for AV devices, the Echonet for home electronics, the Ethernet or USB for PCs and peripheral devices, etc.

There is a trend to connect such home networks with the Internet and provide the Internet connection function to the home electronic devices or enable control of the home electronic devices from the Internet. To this end, there is a need for a device called "home gateway" which is to be located between the home network and the public network (Internet) as an ingress node of the home network. The home gateway is generally equipped with a protocol conversion function (the so called gateway function) besides the home router function, because many devices that cannot understand the Internet protocol are expected to be existing on the home network.

Using such a device, it is expected that the remote controlling of devices on the home network from the Internet becomes possible.

In this case, it is also expected that the security will become a potential problem. Namely, it is necessary to assume the presence of many malicious users (users who are likely to commit improper or illegal acts with respect to specific or unspecified communication devices or networks, or users who can potentially commit such improper or illegal acts, for example) on the Internet, and it is necessary to anticipate potential attacks from such malicious users.

In the case of the enterprise network, it has been customary to provide a "firewall" as an ingress node of the enterprise network so as to block the attacks from the malicious users there. However, this method presumes the existence of a "network manager" of the enterprise network who is responsible for the management tasks regarding the security such as a task of making appropriate setting regarding the security and a task of executing repair software (patch program) which is updated and distributed daily.

In this regard, in the case of the home network, it is practically unrealistic to require the existence of a network manager who can make appropriate setting regarding the security with respect to the home gateway in a general user's home. Consequently, as far as the home network is concerned, it is impossible to use the general technique for preventing attacks from the malicious users by the firewall or the like as in the enterprise network where it is possible to require the existence of the network manager.

BRIEF SUMMARY OF THE INVENTION

It is therefore an object of the present invention to provide a communication system using a home gateway device and an access server device which are capable of preventing attacks from the malicious users with respect to the home network, without implementing excessive security functions in the home gateway and without requiring professional skills for setting and management to the user of the home gateway.

According to one aspect of the present invention there is provided a method of communications by making an access from a first communication device located outside a home network to a second communication device on the home network, the method comprising: transmitting a prescribed message from the first communication device to an access server device corresponding to a home gateway device provided at the home network by specifying an access number/address corresponding to the home gateway device; carrying out an authentication procedure for authenticating the first communication device according to a prescribed authentication method between the access server device and the first communication device upon receiving the prescribed message at the access server device; transferring the prescribed message through a prescribed access network from the access server device to the home gateway device corresponding to the access number/address specified by the prescribed message, when the authentication procedure is successfully completed; and transferring the prescribed message from the home gateway device to the second communication device through the home network after converting the prescribed message according to a protocol supported by the second communication device, when the prescribed message is received by the home gateway device from the access server device which is registered at the home gateway device in advance.

According to another aspect of the present invention there is provided a method of communications by making an access from a communication device located outside a home network to the home network, the method comprising: transmitting a prescribed message from the communication device to an access server device corresponding to a home gateway device provided at the home network by specifying an access number/address corresponding to the home gateway device; carrying out an authentication procedure for authenticating the communication device according to a prescribed authentication method between the access server device and the communication device upon receiving the prescribed message at the access server device; transferring the prescribed message through a prescribed access network from the access server device to the home gateway device corresponding to the access number/address specified by the prescribed message, when the authentication procedure is successfully completed; and transferring a home page containing information related to the home network which is selected according to the prescribed message, from the home gateway device to the communication device through the the access server device, when the prescribed message is received by the home gateway device from the access server device which is registered at the home gateway device in advance.

According to another aspect of the present invention there is provided an access server device for carrying out access control with respect to a home gateway device of a registered home network, comprising: a memory unit configured to store an authentication table registering in correspondence a first access number to be used in accessing the home gateway device which is a target of the access control by the access server device, a second access number to be used in accessing the access server device at a time of transmitting a prescribed message from a first communication device located outside the registered home network at which the home gateway device is provided, to the home gateway device or a second communication device on the registered home network, and an authentication method to be used in an authentication procedure for authenticating the first communication device between the access server device and the first communication device; a first interface unit configured to receive the prescribed message from the first communication device by using the second access number; a processing unit configured to carry out the authentication procedure between the access server device and the first communication device using the authentication method obtained by referring to the authentication table according to the second access number used in the prescribed message; and a second interface unit configured to transfer the prescribed message to the home gateway device through a prescribed access network by using the first access number obtained by referring to the authentication table according to the second access number used in the prescribed message, when the authentication procedure is successfully completed.

According to another aspect of the present invention there is provided a home gateway device to be provided at a home network, comprising: an interface unit configured to relay communications between the home network and a prescribed access network; a registration unit configured to register an access server device in charge of access control for the home gateway device, with which communications are possible through the prescribed access network; and a control unit configured to handle accesses from outside the home network by permitting only those accesses which are made from the access server device which is registered by the registration unit in advance.

Other features and advantages of the present invention will become apparent from the following description taken in conjunction with the accompanying drawings.

BRIEF DESCRIPTION OF THE DRAWINGS

FIG. 4 is a block diagram showing an exemplary internal configuration of an access server in the communication system of FIG. 1.

FIG. 5 is a flow chart for a registration processing to be carried out in the communication system of FIG. 1.

FIG. 6 is a diagram showing an exemplary form of an authentication table used by an access server in the as communication system of FIG. 1.

FIG. 7 is a sequence chart showing one part of a processing sequence for an access from an external to a home network side in the communication system of FIG. 1.

FIG. 8 is a sequence chart showing another part of a processing sequence for an access from an external to a home network side in the communication system of FIG. 1.

FIG. 9 is a sequence chart showing a processing sequence for an access from a home network side to an external in the communication system of FIG. 1.

FIG. 10 is a sequence chart showing a processing sequence for a home network ccontrol page production in the communication system of FIG. 1.

FIG. 11 is a diagram showing an exemplary form of a home electronics database used by an access server in the communication system of FIG. 1.

DETAILED DESCRIPTION OF THE INVENTION

Referring now to FIG. 1 to FIG. 11, one embodiment of a communication system using a home gateway and an access server according to the present invention will be described in detail.

Figure 1:
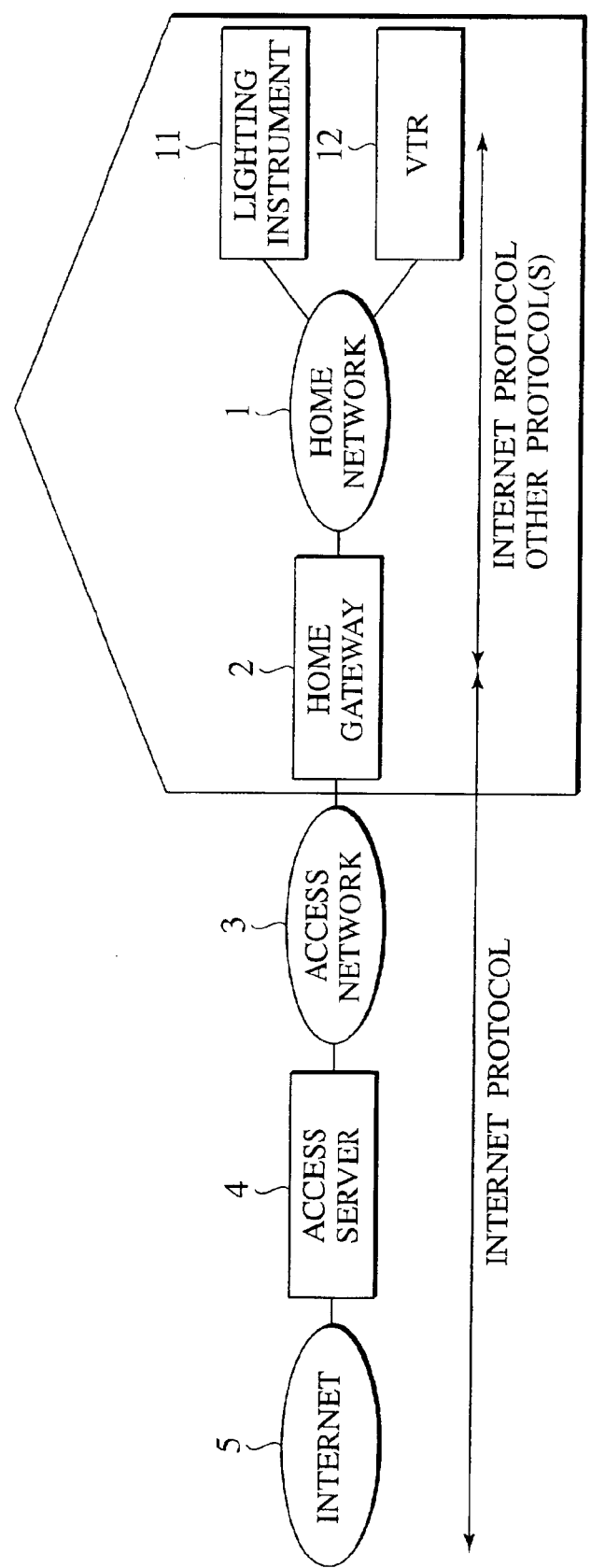
FIG. 1 is a block diagram showing an exemplary overall configuration of a communication system according to one embodiment of the present invention.

FIG. 1 shows an exemplary overall configuration of a communication system in this embodiment.

As shown in FIG. 1, a home gateway 2 and various digital home electronics such as home electronic devices, AV devices, PCs, etc. (a lighting instrument 11 and a VTR 12 are shown as examples in FIG. 1) are connected to a home network 1 in the home. The home network 1 can be formed in practice by using multiple network technologies such as IEEE 1394 and Echonet, for example. Also, the devices connected to the home network 1 are not necessarily compatible with the Internet protocol.

The home gateway 2 is connected with an access network 3. The access network 3 is a portable telephone network, for example. An access server 4 is connected to the access network 3, and the access server 4 is also connected to the Internet 5.

Note that the access network 3 and/or the home network 1 may be operated by a protocol compatible with the Internet protocol (IP). Here, the access network 3 and the Internet 5 are described as separate networks for the sake of explanation, but the case where the access network 3 is operated by a protocol compatible with the Internet protocol (IP) is not to be excluded.

There are variations regarding which service provider should be managing the access network 3 and the access server 4. For example, both the access network 3 and the access server 4 can belong to the management by a communication service provider such as that of portable telephones (in which case the communication service provider also provides an Internet service as well). Alternatively, the access network 3 can belong to the management by a communication service provider such as that of portable telephones while the access server 4 belongs to the management by an ISP (Internet Service Provider). Many other management forms are also possible.

The home gateway 2 is a device for connecting the home network 1 and the access network 3. The home gateway 2 realizes various functions such as controlling various devices (such as the lighting instrument 11 and the VTR 12, for example) connected to the home network 1 in the home from outside of the home, and sending AV contents in the home (AV contents recorded by the VTR 12, for example) to outside of the home through the access network 3, for example.

Note that, in the case of carrying out communications between a device located outside the home network 1 (a device connected to the Internet 5, for example) and a device on the home network 1, it is preferable to carry out packet communications using encryption or digital signature at least between the device located outside the home network 1 and the home gateway 2, and/or between the device located outside the home network 1 and the access server 4, and/or between the access server 4 and the home gateway 2.

Figure 2:
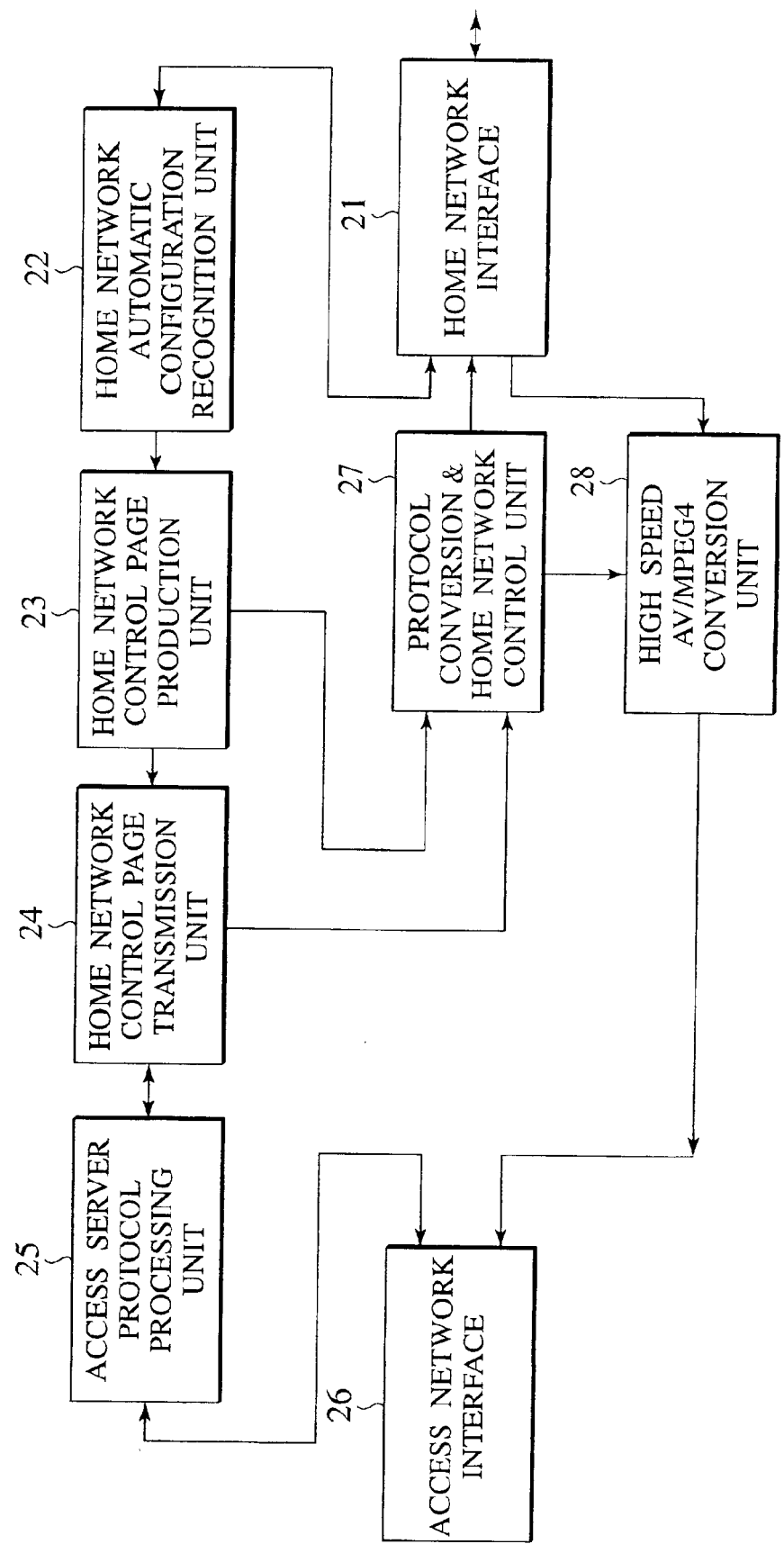
FIG. 2 is a block diagram showing an exemplary internal configuration of a home gateway in the communication system of FIG. 1.

FIG. 2 shows an exemplary internal configuration of the home gateway 2.

As shown in FIG. 2, the home gateway 2 comprises a home network interface 21, a home network automatic configuration recognition unit 22, a home network control page production unit 23, a home network control page transmission unit 24, an access server protocol processing unit 25, an access network interface 26, a protocol conversion and home network control unit 27, and a high speed AV/MPEG4 conversion unit 28.

In this home gateway 2, the home network automatic configuration recognition unit 22 that is connected with the home network 1 through the home network interface 21 will automatically detects devices connected to the home network 1. For example, in the case where the home network 1 is the IEEE 1394, the home network automatic configuration recognition unit 22 carries out the automatic configuration recognition by reading the IEEE 1212 register, issuing the AV/C command, carrying out the HAVi registry processing, etc.

The home network control page production unit 23 converts the result of this automatic configuration recognition into a control screen in a form of a "home page". In this "home page", a control page for home electronics connected to the home network 1 will be created in a form shown in FIG. 3, for example.

The production of this "home page" is carried out automatically. To this end, a model control screen for each device can be provided in the home network control page production unit 23 in advance such that this "home page" can be produced by combining these model control screens of various devices in accordance with the automatic configuration recognition result, or this "home page" can be produced by combing control screens sent from various devices in accordance with the automatic configuration recognition result.

The home network control page transmission unit 24 transmits the generated home page for controlling home electronics according to a request from the internet 5 side. A home network control page transmission request message with respect to the home gateway 2 that arrives through the access network interface 26 is identified by the access server protocol processing unit 25, and the home network control page transmission unit 24 transmits the home network control page to a device (not shown) on the Internet 5 side which issued this request.

The device on the Internet 5 side makes a control request for home electronics connected to the home network 1, on this control screen. The protocol conversion and home network control unit 27 receives the control request message from the device on the Internet 5 and carries out the actual control processing. The protocol conversion and home network control unit 27 converts this control request message into a protocol command of the home network 1 (an AV/C command in the case of the control request for an AV device connected to the IEEE 1394, for example), and transmits this protocol command to a corresponding device through the home network interface 21.

For example, when this request is an "AV data reproduction" request with respect to an AV device (the VTR 12, for example) connected to the home network 1, the home gateway 2 receives the AV data from the corresponding AV device, carries out a code conversion processing (such as a processing for conversion from MPEG2 to MPEG4, for example) for adapting the AV data to the access network 3 (which has more stringent limitations on the transmission bandwidth or the like compared with the home network 1) at the high speed AV/MPEG4 conversion unit 28, and transmits the converted AV data to the access network 3 and the Internet 5 through the access network interface 26.

FIG. 4 shows an exemplary internal configuration of the access server 4.

As shown in FIG. 4, the access server 4 comprises an access network interface 31, a home gateway protocol processing unit 32, a first firewall processing unit 33, a home gateway control page transmission unit 34, an Internet interface 35, and a second firewall processing unit 36. The access server 4 may also have a home electronics database 37 as will be described below.

Note that, in this embodiment, the first firewall processing unit 33 includes a function for processing HTTP, while the second firewall processing unit 36 includes a function for processing a protocol for AV data transfer. It is also possible to use various other configurations such as that in which the first firewall processing unit 33 includes a function for processing packets from the Internet 5 to a direction of the access network 3 and the home network 1, while the second firewall processing unit 36 includes a function for processing packets from the home network 1 and the access network 3 to a direction of the Internet 5, for example. it is also possible to use a configuration in which these firewall processing units are integrated into one.

On the Internet 5 side of the access server 4, the home gateway control page transmission unit 34 is provided, and this home gateway control page transmission unit 34 carries out the transmission of the control page of the (specific) home gateway 2 on behalf of the actual (specific) home gateway 2. Also, on the access network 3 side, the home gateway protocol processing unit 32 is provided, and this home gateway protocol processing unit 32 carries out a protocol processing defined between the home gateway 2 and the access server 4 as will be described below.

Note that this access server 4 can provide services with respect to a plurality of home gateways simultaneously, in such a way that any of the services to be described below can be provided simultaneously in parallel (that is, this access server 4 can be a proxy of a plurality of home gateways simultaneously).

Next, the case where a user subscribes to a utilization of a proxy service for this home gateway, with respect to the service provider (a communication service provider of portable telephones, for example) that is providing that service, as in the case where a user purchased this home gateway, for example, will be described.

In this embodiment, the utilization of the proxy service for the home gateway 2 is to be registered with respect to the service provider. The service provider provides the access server 4 to realize an architecture in which general users including this user will access this home gateway 2 though this access server 4 (that is, the access server 4 becomes a proxy of this home gateway 2). This architecture is designed such that the security function such as the so called "firewall processing" will be provided by the service provider side by demanding the accesses to this home gateway 2 to pass through the access server 4 of that service provider once. In this way, it becomes possible to realize the security processing such as the prevention of invasions by the malicious users such as hackers, without requiring the excessive security function on the home gateway 2 side.

FIG. 5 shows an exemplary processing procedure in this case.

First, the user registers an authentication method for authenticating that user (an authentication method for the authentication between the access server and that user) at a prescribed timing such as at a time of purchasing the home gateway or at a time of notification (subscription) of the use of that home gateway to the service provider (step S1). There are various methods that can be used for this individual authentication method, such as a method using password, a method based on the fingerprint matching or the cornea matching, a method using exchanges of predetermined key or signature, a method for judging the user from a source address (telephone number, etc.) in the case of allowing only accesses from specific portable telephones or PCs, etc.

Next, the service provider assigns an access number to be used in making accesses to that home gateway 2 (step S2). For example, when that user wishes to make accesses to the own home gateway 2 from a portable telephone, the service provider assigns a number such as "090-1234-XXXX", for example, as the access number to be used in making accesses to that home gateway 2. Thereafter, the user can try to make access to this home gateway 2 by inputting this access number "090-1234-XXXX" (in which case the authentication will take place first).

Note that the exchange of information at the steps S1 and S2 can be carried out through the access network 3, or through a communication network other than the access network 3, or through some recording medium.

Next, the content notified as in the above is registered into an authentication table provided in the first firewall processing unit 33 of the access server 4 (step S3).

FIG. 6 shows an exemplary form of this authentication table. As shown in FIG. 6, this authentication table registers the access number, the individual authentication method, the communication method with respect to the access number, the authentication content, and the access number (address) of the actual home gateway which is a target of the proxy service. It is also possible to use any other combinations of the individual authentication methods and the communication methods different from those shown in FIG. 6 are also possible.

By referring to this authentication table, it is possible to ascertain: (1) the individual authentication method to be used in judging whether a user who made access to a specific access number is the subscribed (or pre-registetered) user or not, and the authentication content regarding an actual authentication procedure; (2) the communication method to be used between the user on the Internet 5 side and the access number of this access server 4; and (3) the way of making access to the actual home gateway 2 which is a target of the proxy service.

Note that it is preferable to use a protocol for ensuring the security such as SSL, S-HTML, etc., as the communication method between the user on the Internet 5 side and this access server 4. It is possible to maintain the secrecy of the communications between the user and the access server 4 by carrying out the packet communications using encryption or electronic signature.

Also, this access server 4 is registered as the so called "proxy server" on the home gateway 2 side (step S4). This registration can be made by various methods, such as a method in which the user makes this registration manually, a method in which the service provider or the retail store makes this registration on behalf of the user, and a method in which the necessary information is recorded on an IC card or a memory card and the user makes this registration later on by inserting that card into the home gateway 2, for example.

The home gateway 2 handles accesses from the Internet 5 side, or from the access network 3 side, or from outside of the home network 1 in such a way that any accesses from devices other than the access server 4 registered as the proxy server will be refused. In this way, the security setting of the home gateway 2 can be made extremely simple.

In addition, the communications between this home gateway 2 and the access server 4 are set up to prevent attacks such as pretending, by using the security protocol such as IPSec, for example. Else, the access server 4 and the home gateway 2 are connected by a dedicated line connection. In this way, all the accesses to the home gateway 2 are required to pass through the access server 4 (which is the proxy server of this home gateway 2), so that it becomes possible to prevent attacks such as invasions by the malicious users with respect to the home gateway 2 or the home network 1, as long as the security of the access server 4 is ensured.

Next, the processing sequence in the case where a device on the Internet 5 carries out communications with a home electronic device on the home network 1 through the access server 4, the access network 3 and the home gateway 2 will be described.

Here, the exemplary case of remote controlling the home electronic device through the home gateway 2 from a portable telephone connected to the Internet 5 (such as a portable telephone having an Internet service utilization function, for example) will be described.

FIG. 7 and FIG. 8 show an exemplary processing sequence in this case.

Figure 3:
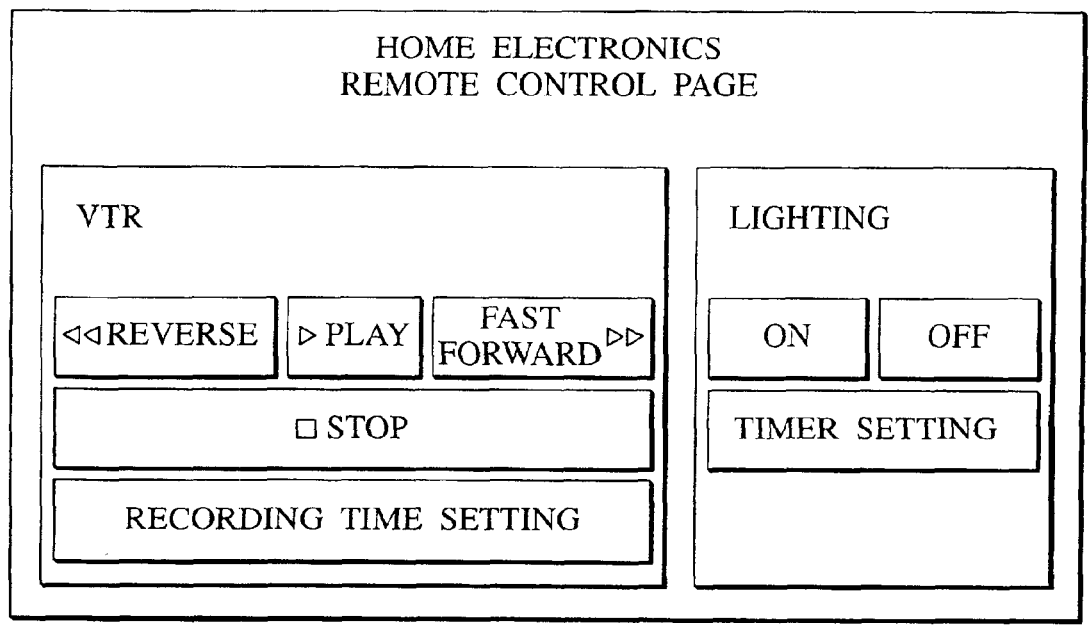
FIG. 3 is a diagram showing an exemplary form of a home electronics control page used in the communication system of FIG. 1.

The home gateway 2 transmits a configuration inquiry message with respect to the home network 1 side at a prescribed timing by the operation of the home network automatic configuration recognition unit 22 (step S11). receives a configuration response message from a home electronic device or a directory server (not shown) on the home network 1 (step S12), and produces the home network control page as shown in FIG. 3 according to that configuration response message (step S13).

Here, in the case where a home electronic device that is not registered in the home gateway 2 in advance is detected (the case where a device, service, sub-unit or the like of unknown type is detected) at the step S13, the control page cannot be produced in a usual way. For this reason, it is possible to use a configuration in which the home gateway 2 can acquire information regarding such a home electronic device that is not registered yet by inquiring to the access server 4 in such a case.

FIG. 10 shows an exemplary processing sequence for such a case.

Here, the access server 4 is assumed to have a home electronics database 37 that registers latest home electronic devices, their detailed information such as their control methods or attribute information, and data such as control screens, etc., for example (it is of course also possible to store information regarding all or some of home electronic devices that are not the latest ones, in addition to information on the latest home electronic devices). FIG. 11 shows an exemplary form of the home electronics database 37.

When a home electronic device that is not registered in the home gateway 2 in advance is detected at the step S13, the home gateway 2 transmits an inquiry message containing a home gateway ID and information indicating that home electronic device that is detected but not registered (unknown device type, service type or sub-unit type, for example), to the access server 4 (step S101).

Upon receiving this inquiry message, the access server 4 searches through the home electronics database 37 for a requested home electronic device (device, service or subunit, for example) (step S102).

Then, the access server 4 returns a response message containing appropriate data (detailed information, control screen, etc. of that home electronic device), according to a type of that inquiring home gateway 2 (step S103).

Upon receiving this response message, the home gateway 2 appropriately produces the home network control page according to the acquired data such as detailed information, control screen, etc. of that home electronic device (step S105).

Note that the home gateway 2 may additionally register the acquired data such as detailed information, control screen, etc. of that home electronic device into the protocol conversion and home network control unit 27 (step S104).

Now, the user who wishes to control the home electronics on the home network 1 sends an access request message from the portable telephone (not shown) through the Internet 5 to the access server 4 (step S21). At this point, the user is merely making an access to the access number (090-1234-XXXX, for example) determined earlier, and there is no need for the user to be conscious of the fact that the access to the access server 4 is made (the user may rather regard this as an attempt to make an access to the desired home gateway 2).

Upon receiving the access request message, the access server 4 checks the authentication method by referring to the authentication table according to the access number used (step S22), and carries out a challenge of the authentication with respect to the requesting user (portable telephone (step S23).

Upon receiving this challenge of the authentication, the portable telephone returns an appropriate response (such as password input or fingerprint input, for example) to the access server 4 (step S24).

Upon receiving this response, the access server 4 checks the authentication content (step S25).

If the user is verified as legitimate, the access server 4 checks the corresponding home gateway 2 by referring to the authentication table, and makes an initial page transmission request to that home gateway 2 through the access network 3 (step S26).

Upon receiving the transmission request message, the home gateway 2 transmits the initial page to the access server through the access network 3 (step S27).

Note that the steps Sil to S13 may be carried out between the steps S26 and S27 instead.

The access server 4 transmits the initial page so acquired to the portable telephone by pretending that it is transmitted by the home gateway control page transmission unit 34 of the access server (step S28). At this point, the access server 4 may carry out the necessary conversion of the home page description format such as conversion from HTML into C-HTML (Compact HTML, which is a kind of Web page description language used by the portable telephones). It is also possible to cache the initial page of the home gateway 2 in the access server 4 in advance.

Suppose now that the portable telephone sends a transmission request message for "home network control page" at this point (step S29). Then, the first firewall processing unit 33 of the access server 4 carries out the security check (step S30), and if it is found as proper (it is verified as a request from the pre-registered user), the first firewall processing unit 33 transmits the home network control page request message to the home gateway 2 (step S31).

In response, the home gateway 2 transmits the home network control page to the access server 4 (step S32).

This control page is then sent to the portable telephone through the home gateway control page transmission unit 34 of the access server 4 (step S33). Note that the portable telephone may regard that this control page is sent from the access server 4.

Here, suppose that the VTR (or VCR) is specified as a control target device at the portable telephone, for example. Then, its control command (indicating an operation of pressing an appropriate button on the home network control page, for example) is sent to the access server 4 (step S34).

The access server 4 carries out the security check again (step S35), and if it is found as proper, the access server 4 transmits a command for VTR control (indicating an operation of pressing an appropriate button on the home network control page, for example) to the home gateway 2 (step S36).

The home gateway 2 converts the received command into a control command compatible with the home network protocol at the protocol conversion and home network control unit 27 (step S37), and transmits it to the home electronic device such as VTR (step S39). At this point, the bandwidth reservation on the home network 1 or the like may be made if necessary (step S38).

As a result, signals such as high speed video signals will be sent from the home electronic device to the home gateway 2 (step S40).

The high speed AV/MPEG4 conversion unit 28 of the home gateway 2 converts these high speed video signals into MPEG4 signals (step S41). In this way, it is possible to carry out the data transmission in a form suitable for the access network 3 (by applying the video compression in accordance with the limited bandwidth, for example).

The converted MPEG4 video signals are then sent to the access server 4 (step S42).

At the access server 4, the second firewall processing unit 36 applies the necessary firewall processing (such as NAT processing and IP masquerade processing) (step S43), and the MPEG4 video signals are sent to the portable telephone through the Internet 5 (step S44).

In this way, the user of the portable telephone can control the home electronics of the own home through the portable telephone and the Internet 5, and view the AV contents in the own home through the portable telephone, for example.

Note that, in the above, the connection from the portable telephone to the access server 4 is described as passing through the Internet 5 once, but the case where the portable telephone makes a connection to the access server 4 through a communication network (which can be the access network 3) of the communication service provider who is also providing the Internet service (without passing through the Internet 5), for example, can also be handled similarly.

Up to this point, the exemplary case of the access from the internet 5 side to the home network 1 side has been described. In the following, the exemplary case of the access from the home network 1 side to the Internet 5 side will be described.

FIG. 9 shows an exemplary processing sequence in this case.

Here, assuming that a PC (not shown) is connected to the home network 1 as a home electronic device, the exemplary case of making an access from this PC to a WWW server (not shown) on the Internet 5 will be described.

First, as already mentioned above, the access server 4 is registered as the proxy server at the PC (step S51).

When an access request for the WWW server on the Internet 5 is made from the PC, this access request message is sent to the access server 4 which is the proxy server (step S52).

At the access server 4, the proxy processing is carried out by the first firewall processing unit 33 (step S54), and the access request message is transferred to the actual WWW server. Here, this request is transferred as if it is requested by this access server 4.

In response, the WWW server transmits a response message, which is received by the first firewall processing unit 33 of the access server 4 (step S55).

The first firewall processing unit 33 of the access server 4 then carries out the proxy server processing (such as NAT processing, IP masquerade processing, and application gateway processing, for example) on that response message (step S56), and transfers the resulting response message to the PC (step S57).

These exchanges will be carried out for accesses with respect to any WWW servers.

Note that FIG. 9 shows as if a packet is transmitted directly from the PC to the access server 4, but a packet may be terminated once at the home gateway 2. Namely, it is also possible to use an architecture in which the processing such as application gateway processing, NAT processing and IP masquerade processing is carried out at the home gateway 2 such that communications will appear to be carried out only with the home gateway 2 from a viewpoint of the access server 4. In this case, the proxy server registered at the PC can be the home gateway 2.

Also, in the above, it is assumed that the WWW server exists on the Internet 5, but the case of making an access to a WWW server existing on a communication network (which can be the access network 3) of the communication service provider who is also providing the Internet service (without passing through the Internet 5), for example, can also be handled similarly.

It is also possible to allow the user to freely select an option for utilizing the proxy service (by the access server 4) provided by the service provider or an option in which the user carries out the necessary setting and tasks with respect to the home gateway 2 by playing a role of the network manager. It is also possible to use both of them in combination.

It is also possible to use a configuration in which the proxy service provided by the access server 4 is utilized basically, but a function for enabling the setting for the authentication by a simple procedure that does not require the knowledge usually required to the network manager is also provided on the home gateway 2 such that direct accesses from the external (Internet) to the home gateway 2 can be made only from limited devices or users.

For example, a password or the like is registered at the home gateway 2 and the user enters the correct password or the like into a terminal device such as a portable telephone at a time of making an access from the external (or the password or the like is registered into the portable terminal or the like in advance) such that the access to the home gateway 2 is permitted only to the portable terminal that has returned the correct password or the like.

As described, according to the present invention, the security function (firewall function) for the home network side is provided by the access server device on the service provider (such as communication service provider) side, so that it becomes possible to prevent attacks from the malicious users with respect to the home network, without implementing excessive security functions in the home gateway device on the home network side and without requiring professional skills for setting and management to the user of the home gateway device.

It is to be noted that the above described embodiment according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each of the home gateway and the access server of the above described embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiment may be made without departing from the novel and advantageous features of the present invention. Accordingly, all such modifications and variations are intended to be included within the scope of the appended claims.

What is claimed is:

1. A method of communications by making an access from a first communication device located outside a home network to a second communication device on the home network, the method comprising:

transmitting a prescribed message from the first communication device to an access server device corresponding to a home gateway device provided at the home network by specifying an access number/address corresponding to the home gateway device;

carrying out an authentication procedure for authenticating the first communication device according to a prescribed authentication method between the access server device and the first communication device upon receiving the prescribed message at the access server device;

transferring the prescribed message through a prescribed access network from the access server device to the home gateway device corresponding to the access number/address specified by the prescribed message, when the authentication procedure is successfully completed; and transferring the prescribed message from the home gateway device to the second communication device through the home network after converting the prescribed message according to a protocol supported by the second communication device, when the prescribed message is received by the home gateway device from the access server device which is registered at the home gateway device in advance.

2. The method of claim 1, further comprising:

transferring information received from the second communication device after transferring the prescribed message to the second communication device, from the home gateway device to the first communication device through the access server device after applying a protocol conversion to the information.

3. A method of communications by making an access from a communication device located outside a home network to the home network, the method comprising:

transmitting a prescribed message from the communication device to an access server device corresponding to a home gateway device provided at the home network by specifying an access number/address corresponding to the home gateway device;

carrying out an authentication procedure for authenticating the communication device according to a prescribed authentication method between the access server device and the communication device upon receiving the prescribed message at the access server device;

transferring the prescribed message through a prescribed access network from the access server device to the home gateway device corresponding to the access number/address specified by the prescribed message, when the authentication procedure is successfully completed; and transferring a home page containing information related to the home network which is selected according to the prescribed message, from the home gateway device to the communication device through the the access server device, when the prescribed message is received by the home gateway device from the access server device which is registered at the home gateway device in advance.

4. An access server device for carrying out access control with respect to a home gateway device of a registered home network, comprising:

a memory unit configured to store an authentication table registering in correspondence a first access number to be used in accessing the home gateway device which is a target of the access control by the access server device, a second access number to be used in accessing the access server device at a time of transmitting a prescribed message from a first communication device located outside the registered home network at which the home gateway device is provided, to the home gateway device or a second communication device on the registered home network, and an authentication method to be used in an authentication procedure for authenticating the first communication device between the access server device and the first communication device;

a first interface unit configured to receive the prescribed message from the first communication device by using the second access number;

a processing unit configured to carry out the authentication procedure between the access server device and the first communication device using the authentication method obtained by referring to the authentication table according to the second access number used in the prescribed message; and a second interface unit configured to transfer the prescribed message to the home gateway device through a prescribed access network by using the first access number obtained by referring to the authentication table according to the second access number used in the prescribed message, when the authentication procedure is successfully completed.

5. The access server device of claim 4, wherein:
the second interface unit also receives information from the home gateway device after transferring the prescribed message to the home gateway device; and
the first interface unit also transmits the information received by the second interface unit to the first communication device.

6. The access server device of claim 5, wherein the information represents a home page containing contents regarding devices connected to the registered home network which is produced by the home gateway device.

7. The access server device of claim 5, wherein the information represents data in a prescribed format which is transmitted from the second communication device to which the prescribed message was transferred and which is applied with a protocol conversion at the home gateway device.

8. The access server device of claim 4, further comprising a unit configured to apply encryption processing or digital signature processing to communications with the home gateway device.

9. The access server device of claim 4, wherein the memory unit is capable of registering a plurality of home gateways.

10. The access server device of claim 4, wherein the access server device is provided by a communication service provider who provides the prescribed access network.

11. The access server device of claim 4, wherein the first interface unit carries out communications with the first communication device through an Internet.

12. The access server device of claim 4, wherein the second interface unit carries out communications with the home gateway device through a dedicated line.

13. The access server device of claim 4, further comprising:
a database unit configured to register data containing a control screen of each home electronic device that can be connected to the registered home network; and
a search unit configured to search through the database unit for data of an inquired home electronic device;
wherein the second interface unit also receives an inquiry message regarding an unknown home electronic device from the home gateway device, and returns a response message containing data of the inquired home electronic device obtained by the search unit in response to the inquiry message to the home gateway device.

14. The access server device of claim 4, further comprising a proxy unit configured to carry out a proxy server processing with respect to an access from the registered home network to outside of the registered home network, on behalf of each home gateway registered in the authentication table.

* * * * *